United States Patent

Alger, II et al.

(10) Patent No.: US 7,741,762 B2
(45) Date of Patent: Jun. 22, 2010

(54) DUAL-SPARK PRE-CHAMBERED SPARK IGNITER

(75) Inventors: Terrence Francis Alger, II, San Antonio, TX (US); Barrett Wade Mangold, Atascosa, TX (US)

(73) Assignee: Southwest Research Institute, San Antonio, TX (US)

( * ) Notice: Subject to any disclaimer, the term of this patent is extended or adjusted under 35 U.S.C. 154(b) by 957 days.

(21) Appl. No.: 11/420,369

(22) Filed: May 25, 2006

(65) Prior Publication Data
US 2006/0267469 A1 Nov. 30, 2006

Related U.S. Application Data

(60) Provisional application No. 60/684,837, filed on May 26, 2005.

(51) Int. Cl.
*H01T 13/00* (2006.01)
*H01T 13/20* (2006.01)
*H01T 21/02* (2006.01)

(52) U.S. Cl. ............... 313/143; 313/118; 313/119; 445/7

(58) Field of Classification Search .......... 313/118, 313/119, 143; 445/7
See application file for complete search history.

(56) References Cited

U.S. PATENT DOCUMENTS

| 4,004,562 A | 1/1977 | Rado et al. ............. 123/169 |
| 4,275,328 A | 6/1981 | Watanabe et al. ........ 313/123 |
| 4,308,487 A | 12/1981 | Feaster ................. 315/58 |
| 4,924,829 A | 5/1990 | Cheng et al. ............ 123/259 |
| 5,405,280 A | 4/1995 | Polikarpus et al. ......... 445/7 |
| 5,421,300 A | 6/1995 | Durling et al. .......... 123/266 |
| 5,918,571 A | 7/1999 | Below .................. 123/169 |
| 6,089,201 A | 7/2000 | Hubbard ............. 123/179.21 |
| 7,007,653 B2 | 3/2006 | Labarge et al. .......... 123/169 |

FOREIGN PATENT DOCUMENTS

| JP | 4287826 | 10/1992 |
| WO | 8502066 | 5/1985 |

OTHER PUBLICATIONS

International Preliminary Report on Patentability PCT/US2006/020397, 5 pages, Dec. 13, 2007.
International Search Report with Written Opinion, PCT/US06/20397, 8 pages, Mailed Nov. 9, 2006.

*Primary Examiner*—Bumsuk Won
(74) *Attorney, Agent, or Firm*—Chowdhury & Georgakis PC

(57) ABSTRACT

A dual-electrode spark igniter (spark plug), which has two electrodes extending from the plug body. During a spark event, electricity flows across a first spark gap from a first electrode to a second electrode. Electricity also flows across a second spark gap from the second electrode to ground.

12 Claims, 2 Drawing Sheets

DUAL-SPARK PRE-CHAMBERED SPARK IGNITER

CROSS-REFERENCE TO RELATED APPLICATIONS

This application claims the benefit of U.S. Provisional Application No. 60/684,837 filed on May 26, 2005, which is incorporated herein by reference in its entirety.

TECHNICAL FIELD OF THE INVENTION

This invention relates to engine ignition systems, and more particularly to spark igniters having a pre-combustion chamber.

BACKGROUND OF THE INVENTION

Recent research has shown that increased levels of EGR in spark ignition engines can enable operation at higher compression ratios and loads than were previously possible, due primarily to a reduction in knock tendency. Increasing the amount of dilution by increasing the air/fuel ratio has also been shown to have similar effects.

Implementation of these features gives rise to the problem of ignition and flame propagation at these increased dilution levels. Several companies now sell igniters designed to improve ignitability and promote faster burn rates in the engine. One specific example of these igniters is the torch-style plug (also referred to as a "pre-chambered" plug), sold by several manufacturers. This plug works by having a pre-chamber in the plug where the mixture is ignited. The burning gasses expand, pushing first cold and then hot burned gases from the pre-chamber into the cylinder. The jets that issue from the pre-chamber mix with the un-burned gases and promote more rapid burn rates than stock igniters.

Today's torch-style plugs have two drawbacks that prevent them from being useful in high EGR applications. The first is that the expanding gasses in the chamber push cold, unburnt gases out first, resulting in an ignition delay that must be factored into the engine calibration. The second is that they do not work at very high dilution rates, probably due to heat losses.

DETAILED DESCRIPTION OF THE INVENTION

Figure 1:
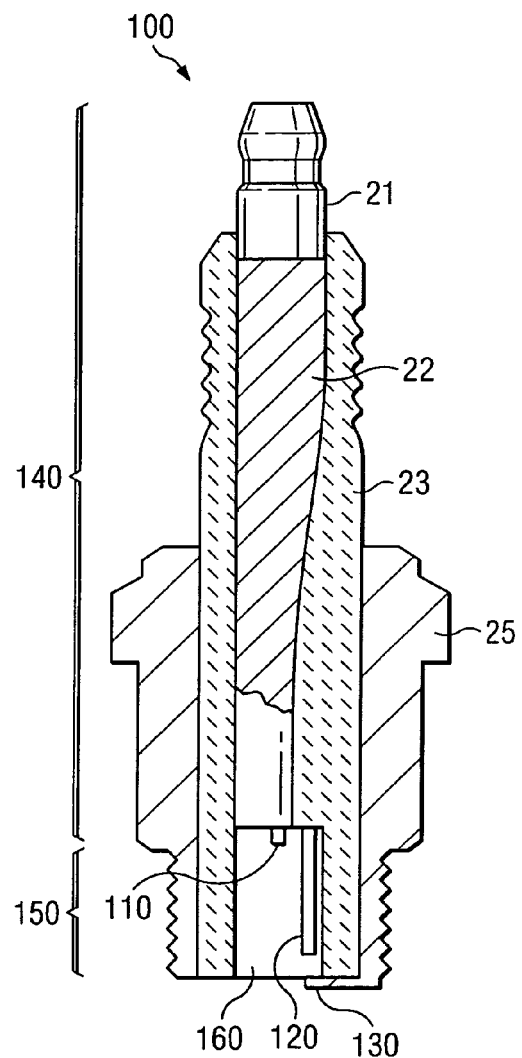
FIG. 1 illustrates an example of a pre-chambered spark igniter in accordance with the invention.
Figure 2:
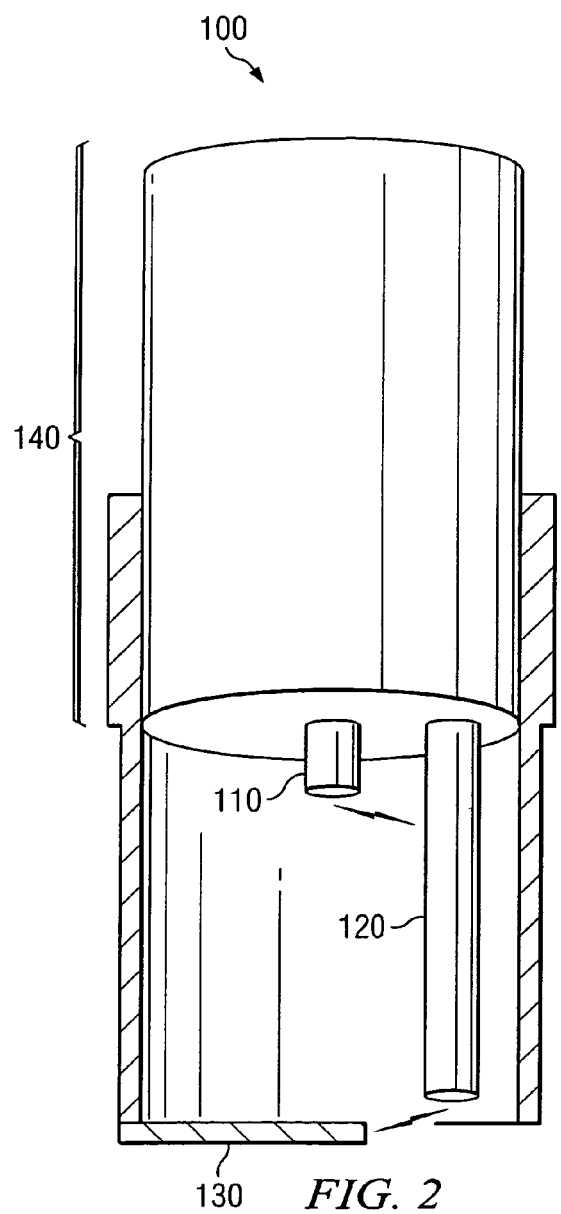
FIG. 2 illustrates the general dual electrode design of the spark plug body 140.

FIGS. 1 and 2 illustrate a torch-style spark plug 100 (also referred to herein as an "igniter") in accordance with the invention. As explained below, a feature of the invention is a dual electrode configuration, which extends the dilution of the engine and increases burn rates.

FIG. 1 is a cross sectional view of one embodiment of the invention, whereas FIG. 2 more generally illustrates the dual electrode concept. As illustrated, two electrodes 110 and 120 extend from the active (spark-generating) end of the plug body 140 into a pre-chamber 150.

In the example of FIG. 1, the pre-chamber 150 is formed by extending the plug body 23 and plug shell 25 past electrodes 110 and 120 to form a chamber within which the electrodes 110 and 120 are situated. Other pre-chamber designs are possible. Pre-chamber 150 may be integral to the plug body 140 as in FIG. 1. Alternatively, the plug body 140 may be inserted into or attached to a separate pre-chamber element 150.

The pre-chamber 150 is in fluid communication with the combustion chamber of an engine cylinder (not shown) via an orifice 160. Plug 100 is also sometimes referred to as a "torch style" plug or a "swirl plug" and pre-chamber 150 is perhaps more accurately described as a "precombustion chamber".

A first electrode 110 is electrically connected to the engine's voltage source, such as to an ignition coil secondary, via an ignition circuit (not shown). The second electrode 120 is at a lower potential than the first electrode 110, and provides a path for electricity to flow to ground from the first electrode 110, across the gap between the first electrode 110 and the second electrode 120. A ground strap 130 allows a spark to also jump across a spark gap, from the second electrode 120 to ground.

In the example of FIG. 1, electrode 110 is a "center electrode" 110 in the sense that it is shorter than electrode 120 and is deeper within pre-chamber 150. The second electrode 120 is spaced from the center electrode 110, and extends from the plug body 140 a farther distance than does the center electrode. In other embodiments, the two electrodes may be in other locations within pre-chamber 150, with a common feature being that there are two electrodes, which provide two spark gaps at different heights relative to the bottom of the pre-chamber (top of the plug body) to its orifice end.

The plug body 140 of plug 100 may be similar to that of a conventional spark plug. A terminal 21 provides an electrical connection to electrode 110 to the ignition circuit via a resistor 22. An outer shell 25 is typically metal and the plug insulator layer 23 is typically a ceramic material. Shell 25 is electrically connected to ground strap 130 and provides a path to ground.

The dual electrode design allows the plug 100 to begin combustion in two places. As a result, the gases at the exit of the torch are ignited immediately. This prevents cold gasses from escaping and sets up a flame front at both ends of the pre-chamber. The unburned gases that are pushed ahead of the flame are burnt as they exit, decreasing the ignition delay and improving ignitability.

Figure 3:
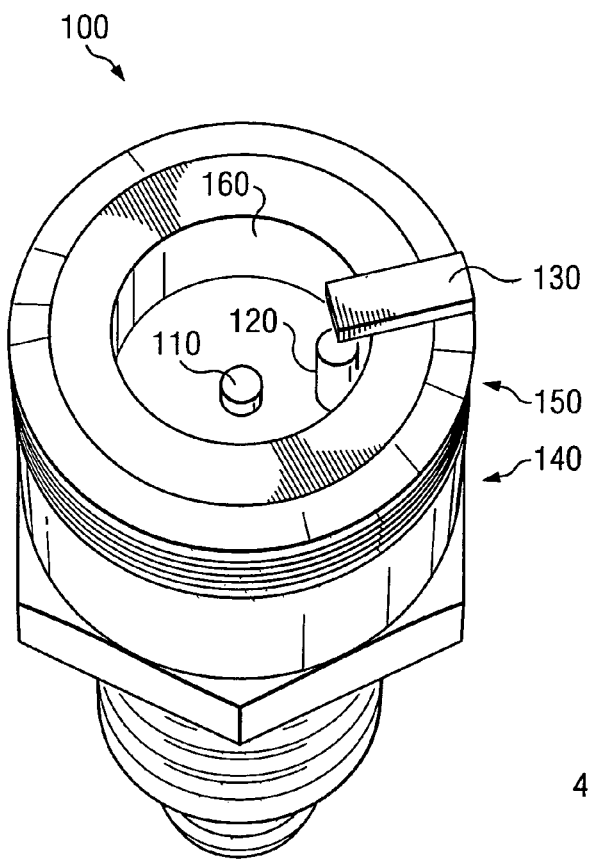
FIG. 3 is a perspective view of the pre-chamber and dual electrodes of the spark igniter of FIG. 1.
Figure 4:
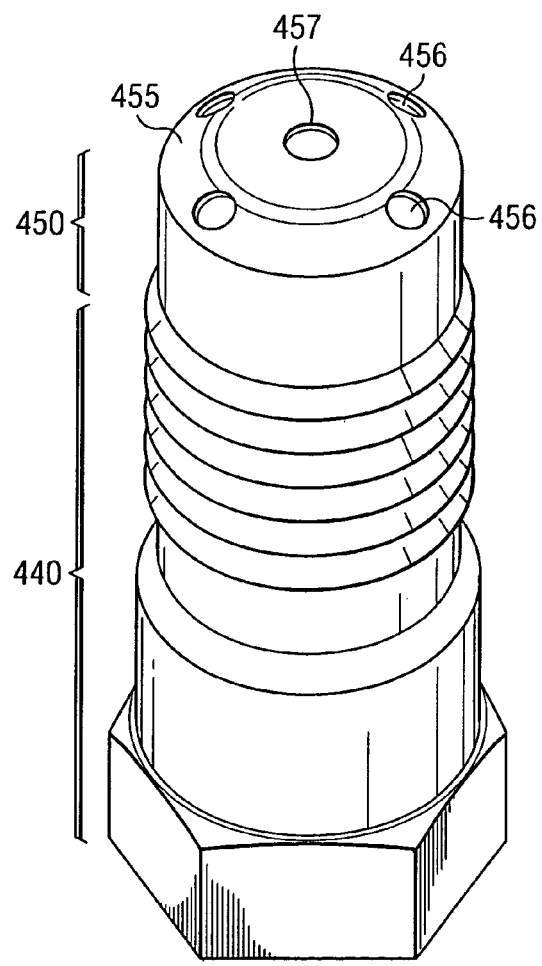
FIG. 4 is a perspective view of a second embodiment for the pre-chamber.

FIGS. 3 and 4 are perspective views of two embodiments of plug 100, each having dual electrodes 110 and 120 located in a pre-chamber. The choice of design would depend on engine configuration and application.

FIG. 3 illustrates a first embodiment, where plug 100 is integrated with a pre-chamber 150, such as in the example of FIG. 1. The embodiment of FIG. 3 is an open chamber design, where the flame exit opening 160 of the pre-chamber 150 is substantially the same diameter as the pre-chamber itself. A single flame exits the pre-chamber 150.

FIG. 4 illustrates a second embodiment, where plug 400 has a closed, multi-exit pre-chamber 450 atop the plug body 440. Pre-chamber 450 is constructed by adding a pre-chamber housing atop the spark plug body 440. The dual electrodes are enclosed within pre-chamber 450. The pre-chamber 450 has a cap portion 455, which has several small holes 456. The gasses exit through these holes, which serve to increase jet velocities. A larger hole 457 may be used to improve scavenging.

The invention claimed is:

1. A spark igniter for an engine having at least one engine cylinder, comprising:
   a spark plug body;
   a first electrode, extending a first distance from the top of the spark plug body;
   a second electrode, spaced from the first electrode and extending from the top of the spark body a second distance, which is greater than that of the first electrode;
   a ground strap connected to electrical ground, and having a spark gap from the second electrode; and
   a precombustion chamber enclosing the first electrode and the second electrode, the chamber having a bottom end and having a top end with at least one orifice in fluid communication with the at least one engine cylinder;
   wherein the spark end of the first electrode is closer to the bottom end of the precombustion chamber than the spark end of the second electrode, and the spark end of the second electrode is closer to the top end of the precombustion chamber than the spark end of the first electrode.

2. The igniter of claim 1, further comprising a shell encasing the spark plug body, and wherein the chamber is formed by extending the shell past the first electrode and the second electrode.

3. The igniter of claim 1, wherein the precombustion chamber is formed by adding a chamber housing atop the spark plug body.

4. The igniter of claim 1, wherein a diameter of the orifice is substantially the same as a diameter of the chamber.

5. The igniter of claim 1, wherein the precombustion chamber has a cap and the orifice is formed by at least one hole in the cap.

6. The igniter of claim 1, wherein the precombustion chamber has a cap having at least one jet orifice and at least one scavenging orifice.

7. The igniter of claim 1, wherein the ground strap is at the level of the at least one orifice.

8. The igniter of claim 1, wherein engine has a voltage source, and the first electrode is in electrical connection with the engine's voltage source.

9. A method of providing dual spark ignition for an engine having at least one cylinder, comprising:
   providing a spark plug having two electrodes extending different lengths from the active end of the spark plug;
   providing a ground strap the longer of the two electrodes, such that a spark from the first electrode will travel across a first spark gap to the second electrode and a spark from the second electrode will travel across a second spark gap to the ground strap; and
   at least partially enclosing the electrodes in a precombustion chamber, the precombustion chamber having a bottom the spark plug and a top having at least one orifice in fluid communication with the at least one engine cylinder; and
   wherein the spark end of the first electrode is closer to the bottom of the precombustion chamber than the spark end of the second electrode, and the spark end of the second electrode is closer to the top of the precombustion chamber than the spark end of the first electrode .

10. The method of claim 9, wherein a diameter of the orifice is substantially the same as a diameter of the chamber.

11. The method of claim 9, wherein the chamber has a cap and the orifice is in the cap.

12. The method of claim 9, wherein the chamber has a cap having at least one jet orifice and at least one scavenging orifice.

* * * * *